United States Patent
Walters et al.

(10) Patent No.: US 11,182,786 B2
(45) Date of Patent: Nov. 23, 2021

(54) SYSTEM AND METHOD FOR PROCESSING SECURE TRANSACTIONS USING ACCOUNT-TRANSFERABLE TRANSACTION CARDS

(71) Applicant: Capital One Services, LLC, McLean, VA (US)

(72) Inventors: Austin Walters, Savoy, IL (US); Vincent Pham, Champaign, IL (US); Jeremy Goodsitt, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 12 days.

(21) Appl. No.: 16/775,366

(22) Filed: Jan. 29, 2020

(65) Prior Publication Data

US 2021/0233072 A1 Jul. 29, 2021

(51) Int. Cl.
*G06Q 20/38* (2012.01)
*G06Q 20/34* (2012.01)

(52) U.S. Cl.
CPC ....... *G06Q 20/3829* (2013.01); *G06Q 20/341* (2013.01); *G06Q 20/389* (2013.01); *G06Q 2220/00* (2013.01)

(58) Field of Classification Search
CPC ............. G06Q 20/3829; G06Q 20/389; G06Q 20/341; G06Q 2220/00
See application file for complete search history.

(56) References Cited

U.S. PATENT DOCUMENTS

| | | | |
|---|---|---|---|
| 6,250,557 B1 | 6/2001 | Forslund et al. | |
| 7,083,095 B2 | 8/2006 | Hendrick | |
| 7,676,438 B2 | 3/2010 | Brewer et al. | |
| 8,141,136 B2 | 3/2012 | Lee et al. | |
| 8,146,831 B2 | 4/2012 | Seemuller | |
| 8,799,084 B2 | 8/2014 | Florek et al. | |
| 10,123,202 B1 | 11/2018 | Polehn et al. | |
| 10,223,694 B2* | 3/2019 | Makhotin | G06Q 20/02 |
| 2001/0032878 A1* | 10/2001 | Tsiounis | H04L 63/0421 235/379 |
| 2003/0014372 A1* | 1/2003 | Wheeler | H04L 63/0823 705/71 |
| 2003/0045328 A1 | 3/2003 | Natsuno | |
| 2004/0088547 A1 | 5/2004 | Colnot | |
| 2004/0195325 A1 | 10/2004 | Kogawa | |
| 2005/0167512 A1 | 8/2005 | Minemura et al. | |
| 2006/0105742 A1 | 5/2006 | Kim et al. | |
| 2006/0218196 A1 | 9/2006 | Kurita | |

(Continued)

*Primary Examiner* — Vincent I Idiake
(74) *Attorney, Agent, or Firm* — Hunton Andrews Kurth LLP

(57) ABSTRACT

In a method for activating account-variable transaction cards having private and public card encryption keys stored therein, private and public personal keys are associated with an account and transmitted to an account holder device. A request for activation of an account-variable transaction card is received by a central processor from the user device. The request includes information encrypted using at least the private personal key and the private card key. The central processor associates an account function with the account-variable transaction card and initiates via a first node in a distributed consensus network, an account blockchain associated with the account and the account-variable transaction card.

6 Claims, 7 Drawing Sheets

(56) References Cited

U.S. PATENT DOCUMENTS

| | | |
|---|---|---|
| 2006/0249572 A1 | 11/2006 | Chen et al. |
| 2006/0287951 A1 | 12/2006 | Chen et al. |
| 2007/0215698 A1 | 9/2007 | Perry |
| 2007/0260558 A1 | 11/2007 | Look |
| 2008/0249948 A1 | 10/2008 | Kim et al. |
| 2010/0057620 A1 | 3/2010 | Li et al. |
| 2010/0213253 A1 | 8/2010 | Wollbrand et al. |
| 2011/0047074 A1 | 2/2011 | Cai |
| 2012/0284194 A1 | 11/2012 | Liu et al. |
| 2013/0332356 A1 | 12/2013 | Park et al. |
| 2015/0161595 A1 | 6/2015 | Sears |
| 2016/0203469 A1 | 7/2016 | Cisse |
| 2017/0286873 A1 | 10/2017 | Grimault et al. |
| 2019/0045354 A1 | 2/2019 | Polehn et al. |
| 2019/0073666 A1 | 3/2019 | Ortiz et al. |
| 2020/0195436 A1* | 6/2020 | Khan .................... H04L 9/3213 |

\* cited by examiner

SYSTEM AND METHOD FOR PROCESSING SECURE TRANSACTIONS USING ACCOUNT-TRANSFERABLE TRANSACTION CARDS

FIELD OF THE INVENTION

This disclosure relates generally to systems and methods for processing credit and other transaction cards, and more specifically, to a system and method for processing transactions using a transaction card that can be securely transferred from one account to another.

BACKGROUND OF THE INVENTION

Financial transaction cards have become the primary means of carrying out in-person transactions in today's society and the technology associated with and embedded into these cards has increased dramatically. At the same time, there has been a movement to personalize the appearance of transaction cards. As a result, the cards themselves have become more individualized and more expensive, and, thus, have come to take on intrinsic value aside from their usefulness in facilitating financial transactions. As a further result, there is a desire to extend the life of the card and to avoid replacement, even if there are changes in the account associated with the card or changes in ownership of the card.

SUMMARY OF THE INVENTION

An illustrative aspect of the invention provides a method for activating account-variable transaction cards. The method comprises providing a plurality of account-variable transaction cards, each having a card memory with a private card key and a public card key stored therein. The method further comprises associating, by a central processing system, a private personal key and a public personal key with an account associated with an account holder device and transmitting, by the central processing system to the account holder device via a network, the private personal key and the public personal key. The method still further comprises receiving, by the central processing system from the account holder device via the network, a request for activation of a first account-variable transaction card having a first private card key and a first public card key. The request includes information encrypted using at least the private personal key and the first private card key. The method also comprises associating, by the central processing system, an account function with the first account-variable transaction card and initiating, by the central processing system via a first node in a distributed consensus network, an account blockchain associated with the account and the first account-variable transaction card.

Another aspect of the invention provides a transaction processing system comprising an account holder user device having a device data processor and a device memory having a private personal key and a public personal key stored therein. The private personal key and the public personal key are associated with an account. The system further comprises a plurality of account-variable transaction cards, each having a card microprocessor, a card communication interface configured for communication with the account holder device, and a card memory having a private card key and a public card key stored therein. The method also comprises a central card processing system comprising a first communication interface configured for selective communication with the account holder device via a first network and a second communication interface in communication with a distributed consensus network. The central processing system further comprises a transaction card management server configured to receive, from the account holder device via the network, a request for activation of a first account-variable transaction card having a first private card key and a first public card key. The request includes information encrypted using at least the private personal key and the first private card key. The transaction card management server is further configured to associate an account function with the first account-variable transaction card, and initiate, via a first node in a distributed consensus network, an account blockchain associated with the account and the first account-variable transaction card.

Another aspect of the invention provides an account-variable transaction card activation device comprising a device data processor, a network communication interface configured for communication over a network, a card communication interface and a device memory. The card communication interface is configured for data communication with each of a plurality of account variable transaction cards, each having an associated private card key and an associated public card key. The device memory has stored therein a private personal key and a public personal key, the private personal key and the public personal key being associated with an account. The device memory also has stored therein an application comprising instructions for the device data processor to establish data communication with a target card that is one of the plurality of account-variable transaction cards and receive information from the target card. The received information includes the public card key and the private card key of the target card. The application further comprises instruction to transmit, to a central processing system via the network, a target card activation request. The activation request includes information encrypted using at least the private personal key and the private card key of the target card.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

As used herein, the term "transaction card" refers to any identification or payment card associated with a user or user account. This may include, in particular, a credit card, debit card, or gift card, any of which may be issued by a service provider.

The present invention provides a transaction card processing system that allows a transaction card associated with a first account to have its functionality securely transferred to a second account. This is accomplished through the use of card-specific encryption and through the use of a distributed consensus network to maintain transaction information associated with the accounts and the card. The transaction processing system also provides the capability to securely change the association of an account from one transaction card to another.

Figure 1:
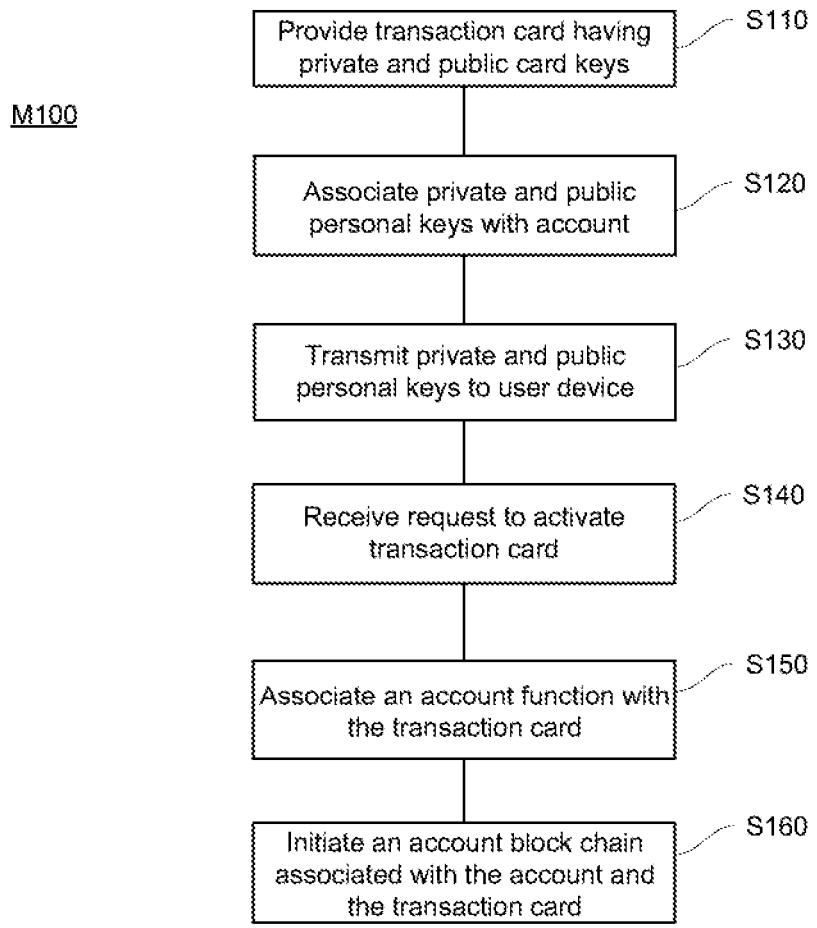
FIG. 1 is a flow chart of actions in a method of activating a transferable transaction card according to an embodiment of the invention.

FIG. 1 illustrates a basic method M100 of activating a transferable transaction card according to an embodiment of the invention. At S110, a card issue provides one or more transferable transaction cards that can be associated with user accounts. Each of these cards is a smart card having a microprocessor chip attached thereto or embedded therein. As will be discussed in more detail hereafter, the microprocessor chip includes a memory in which a card identifier and associated encryption keys associated may be permanently stored. In embodiments of the invention, the encryption keys includes a private card key and a public card key for use in encrypting card-specific information and communications. At S120, a network-enabled processing system of the card issuer assigns encryption keys to an account of an account holder to whom a transferable transaction card is to be issued. These encryption keys include a private personal key and a public personal key. At S130, the processing system transmits the private and public personal keys to a user device associated with the account holder.

At S140, the processing system receives a request from the user device to activate the transferable transaction card. In order for the system to activate the transaction card, it must verify that the card and the user device are both associated with the account and that both the card and the user device are in the possession of the requesting account holder. Accordingly, the activation request includes a software signature encrypted by the user device using the public and private personal encryption keys and a hardware signature encrypted by the card microprocessor using the public and private card encryption keys. As will be discussed, the hardware signature may be communicated by the card microprocessor to the user device using near field communication (NFC). Upon receiving the request to activate the transaction card, the processing system may decrypt the software and hardware signatures to verify their association with the account. At S150, the processing system activates the transferable transaction card by associating one or more authorized account functions with the transaction card. An authorized account function could be any typical transaction card functionality such as, for example, interaction with a merchant transaction processing device to carry out a purchase transaction or use in an automatic teller machine. In some embodiments, the card processing system may transmit a notification to the user device indicating that the transaction card is active and usable for carrying out authorized account functions. At S160, the processing system initiates a blockchain associated with the account and the transaction card. This may include transmitting blockchain information incorporating the hardware and software signatures to one or more computing system nodes of a distributed computing network. It may also include storing the blockchain information in a blockchain database.

Figure 2:
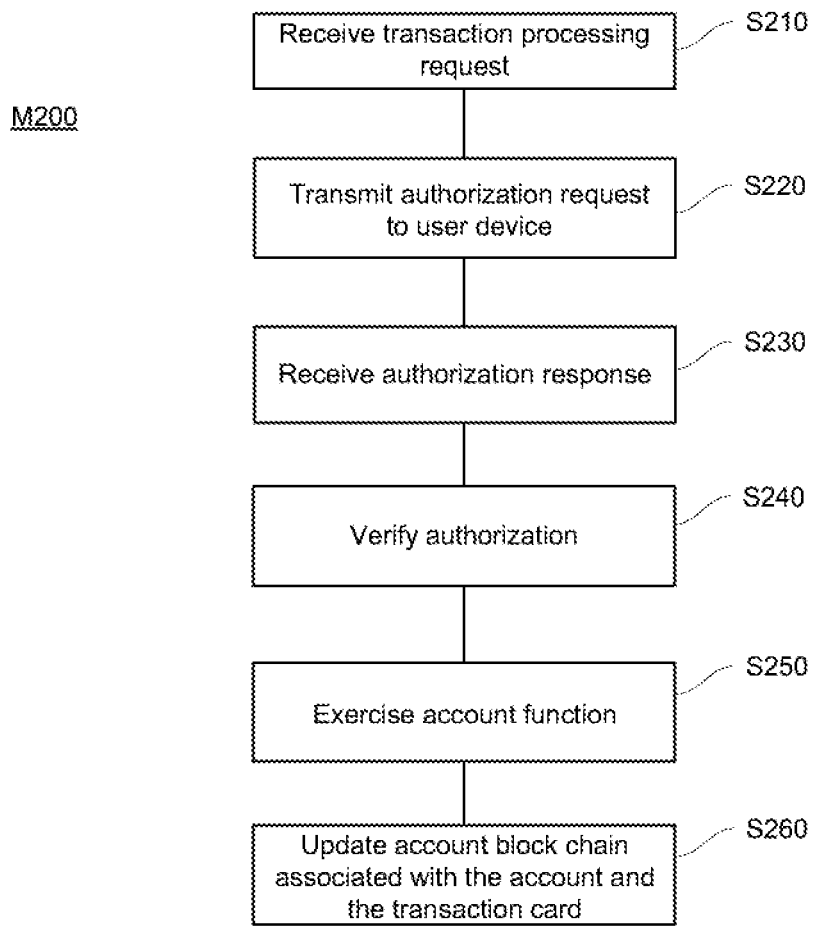
FIG. 2 is a flow chart of actions in a method of processing a transaction involving a transferable transaction card according to an embodiment of the invention.

With reference to FIG. 2, an automated method M200 of processing a transaction using the activated transaction card includes, at S210, receiving a transaction processing request on a card processing system. This request may be received from a merchant transaction processing system, a user processing system associated with the account holder, or other system wishing to process a transaction involving the transaction card. At S220, the card processing system transmits an authorization request to the user device associated with the account and the transaction card. At S230, the system receives an authorization response from the user device including encrypted verification information. The encrypted verification information may include a software signature encrypted using the public and private personal keys. In some embodiments, the verification information may also include a hardware signature encrypted using the public and private card keys. At S240, the card control processing system verifies that the authorization response is valid by decrypting the verification information. Upon verifying that the authorization response is valid, the card processing system exercises the account function at S250. This may include, for example, processing a purchase or other transaction requested by a merchant. At S260, the card processing system updates the blockchain associated with the account and the transaction card. This may include transmitting transaction information, including the hardware and software signatures, to one or more computing system nodes of the distributed computing network. It may also include updating the blockchain information in the database.

Figure 3:
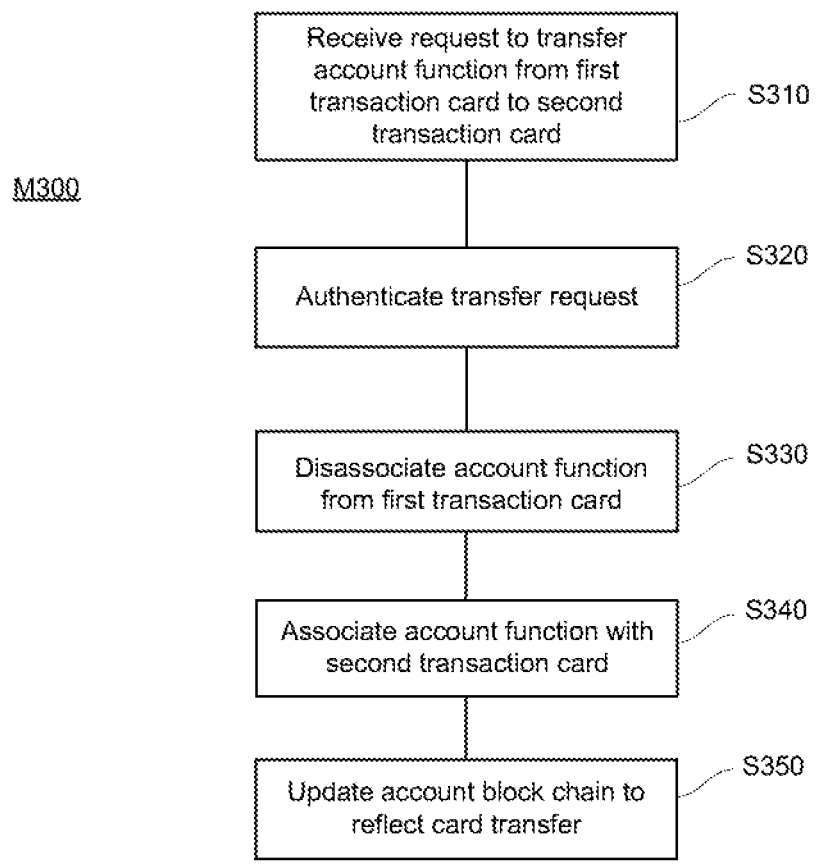
FIG. 3 is a flow chart of actions in a method of transferring account functionality from one transaction card to another according to an embodiment of the invention.

FIG. 3 illustrates a basic method M300 of transferring an account function from a first transferable transaction card to a second transferable transaction card. At S310, a request to transfer one or more account functions from the first card to the second card is received from the account holder's user device by the card processing system. The card transfer request includes a software signature encrypted by the user device using the public and private personal encryption keys and a hardware signature encrypted by the card microprocessor of the second transaction card using the public and private card encryption keys of the second transaction card. In some embodiments, the card transfer request may also include a hardware signature encrypted by the microprocessor of the first transaction card. At S320, the card processing system decrypts the software and hardware signatures to authenticate the card transfer request. At S330, the card processing system disassociates the one or more account functions from the first transaction card, and, at S340, associates the one or more account functions with the second transaction card. At S350, the card processing system updates the blockchain associated with the account to reflect the transfer of functionality from the first card to the second card. This may include transmitting transfer information, including the hardware and software signatures, to one or more computing system nodes of the distributed computing network. In some embodiments, the original blockchain associated with the account and the transaction card may be updated to reflect the disassociation of the card from the account and a new blockchain reflecting the association of the account with the second transaction card initiated.

A variation of the above method can be used to authorize a transfer to an electronic transaction card. In such a variation, the card processing system may transmit request information to a user device, which is then used to establish contact with the electronic transaction card (e.g., via NFC or Bluetooth, etc.). The user device would receive encryption information from the electronic transaction card which could then be used to authorize the transfer.

Figure 4:
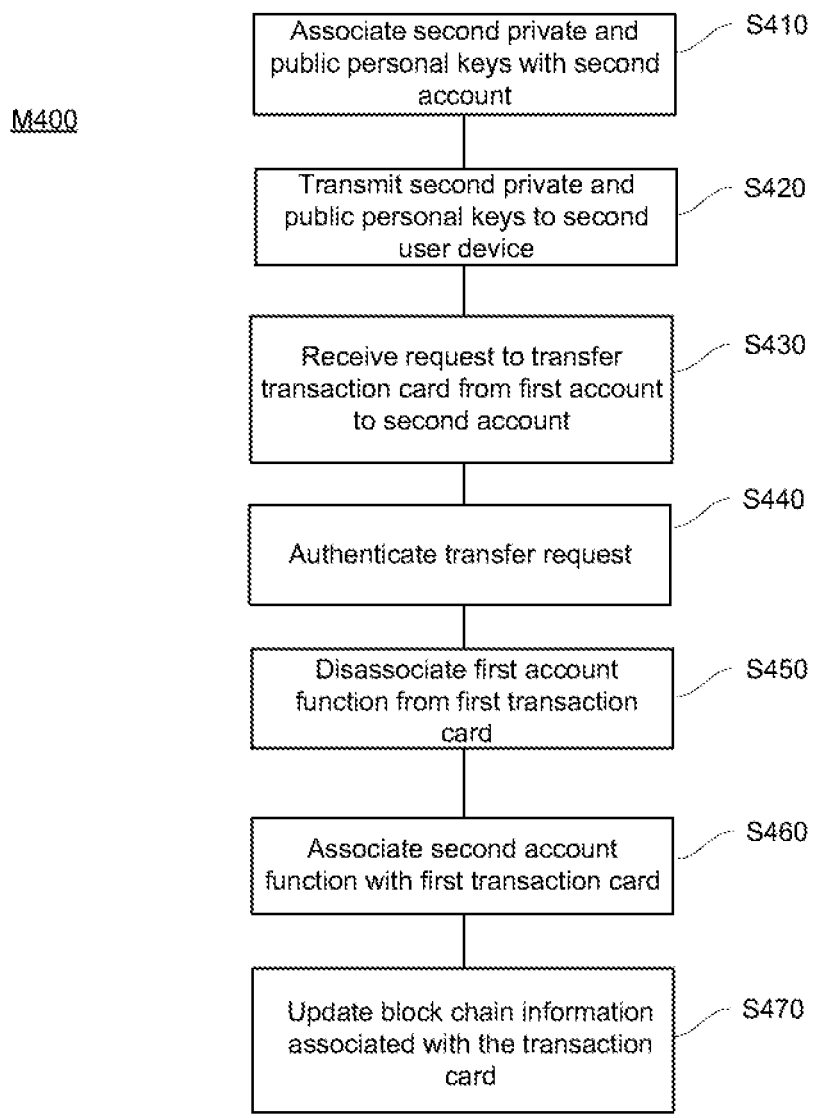
FIG. 4 is a flow chart of actions in a method of transferring transaction card functionality from one account to another according to an embodiment of the invention.

FIG. 4 illustrates a method M400 of changing the association of a transferable transaction card from a first account to a second account. In accordance with the earlier described activation method, the first account has associated with it a first public personal key and a first private personal key, which are stored on a first user device that is also associated with the first account. The second account may be an account of the same account holder or a different account holder. At S410, the card processing system assigns encryption keys to the second account. These encryption keys include a second private personal key and a second public personal key. At S420, the processing system transmits the private and public personal keys to a second user device associated with the second account. It will be understood that the second user device may, in some cases, be the same as the first user device. At S420, the processing system receives a request to transfer the functionality of the transaction card from the first account to the second account. The request may come from either the first or second user devices. At S440, the card processing system authenticates the request. The information included in the request and the actions involved in authenticating the request may depend on whether the request is received from the first or second user device. If the request is received from the first device, the request may include a software signature encrypted by the first user device using the first public and private personal encryption keys. In some embodiments, the request may also include a hardware signature encrypted by the card microprocessor using the public and private card encryption keys. The card processing system may, in response, transmit a request for activation information to the second user device. The system may then receive activation information from the second user device including a second software signature encrypted by the second user device using the second public and private personal encryption keys. To verify the physical transfer of the transaction card, the activation information may also include a hardware signature encrypted by the card microprocessor using the public and private card encryption keys. The processing system may use the encrypted information received from both devices to authenticate the transfer.

If the request is received from the second device, the request may include a software signature encrypted by the second user device using the second public and private personal encryption keys. The request may also include a hardware signature encrypted by the card microprocessor using the public and private card encryption keys. The card processing system may, in response to the transfer request, transmit a transfer authorization request to the first user device. The system may then receive authorization information from the first user device including a software signature encrypted by the first user device using the first public and private personal encryption keys. The processing system may use the encrypted information received from both devices to authenticate the transfer.

In cases where the first and second user devices are the same, the initial transfer request may include first and second software signatures and first and second hardware signatures, which the card processing system uses to authenticate the request. In some embodiments where the account holder and user device are the same for both accounts, the first and second sets of public and private personal keys may be the same. In such cases, the transfer request may require only a single software signature.

Upon authentication of the transfer request, the card processing system disassociates the transaction card from the functions of the first account at S450. At S460, the processing system reactivates the transferable transaction card by associating one or more authorized account functions of the second account with the transaction card. In some embodiments, the card processing system may transmit a notification to either or both of the user devices to indicate that the transaction card has been deactivated with respect to the first account and activated with respect to the second account. At S470, the card processing system updates blockchain information to reflect the transfer of card functionality from the first account to the second account. This may include transmitting transfer information, including the hardware and software signatures, to one or more computing system nodes of the distributed computing network. In some embodiments, the original blockchain associated with the transaction card may be updated to reflect the association of the transaction card with the second account and disassociation of the card from the first account. In some embodiments, the original blockchain associated with the transaction card may be updated to reflect the disassociation of the card from the first account and a new blockchain reflecting the association of the card with the second account initiated.

The above-described methods and those of other embodiments of the invention assure secure transfer of account functionality by assuring that a record of all transactions are maintained in a blockchain database stored in multiple systems of a distributed computing environment. Because information is extremely difficult to alter once committed to the blockchain, the systems and methods described herein provide a highly secure mechanism for preventing misappropriation and misuse of the disclosed transferable transaction cards.

Figure 5:
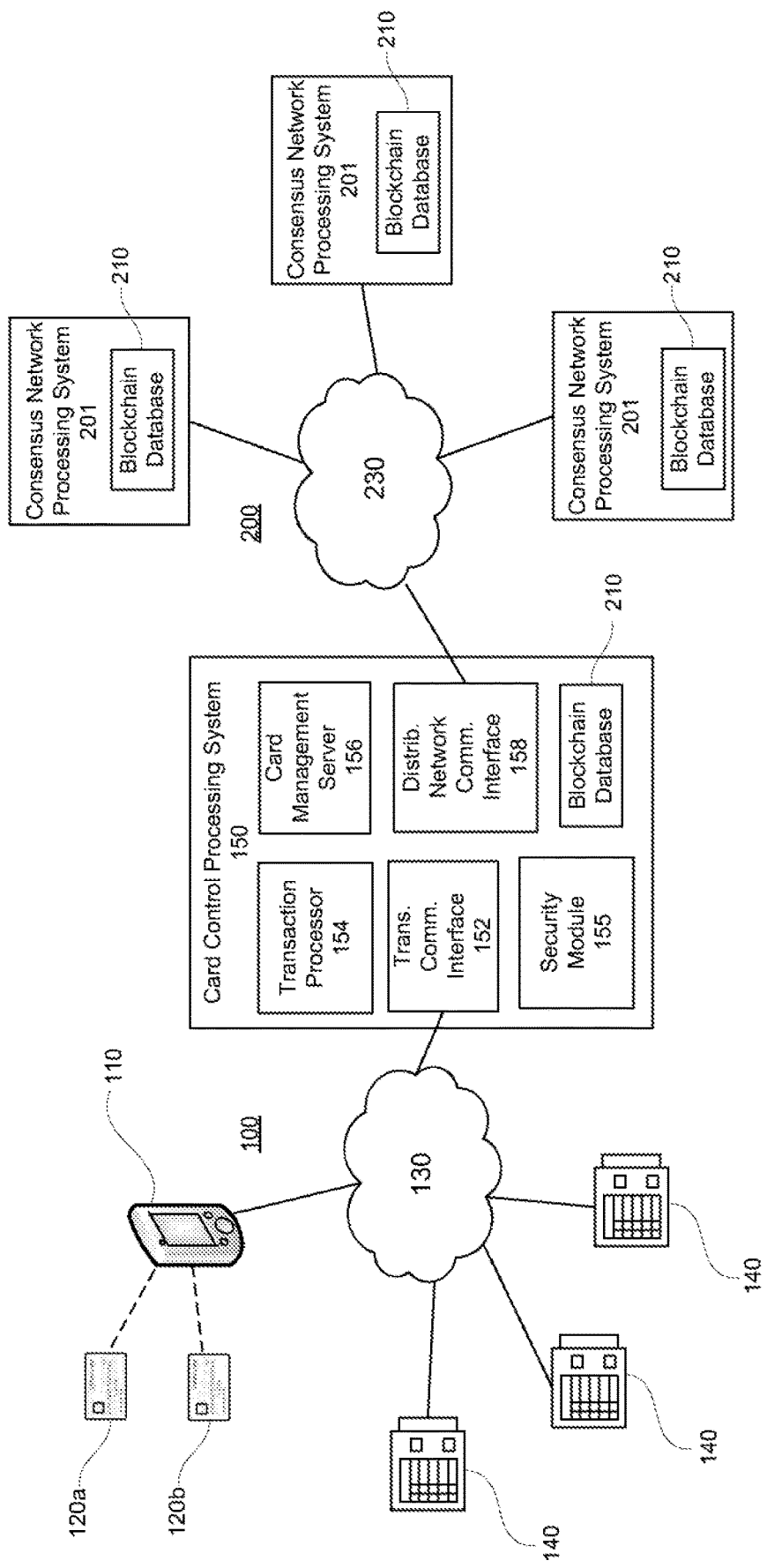
FIG. 5 is a schematic representation of a transaction card processing system according to an embodiment of the invention.

With reference now to FIG. 5, a transaction card processing system 100 according to an illustrative embodiment of the invention includes one or more user devices 110, a card control processing system 150, a communication network 130, one or more merchant transaction processing devices 140, and one or more account-transferable transaction cards 120.

As referred to herein, a network-enabled computer system and/or device may include, but is not limited to any computer device, or communications device including, a server, a network appliance, a personal computer (PC), a workstation, and a mobile processing device such as a smart phone, smart pad, handheld PC, or personal digital assistant (PDA). Mobile processing devices may include Near Field Communication (NFC) capabilities, which may allow for communication with other devices by touching them together or bringing them into close proximity.

The network-enabled computer systems used to carry out the transactions contemplated in the embodiments may execute one or more software applications to, for example, receive data as input from an entity accessing the network-enabled computer system, process received data, transmit data over a network, and receive data over a network. The one or more network-enabled computer systems may also include one or more software applications to notify an account holder based on transaction information. It will be understood that the depiction in FIG. 5 is an example only, and the functions and processes described herein may be performed by any number of network-enabled computers. It will also be understood that where the illustrated system 100 may have only a single instance of certain components, multiple instances of these components may be used. The system 100 may also include other devices not depicted in FIG. 5.

In the example embodiments presented herein, an account holder may be any individual or entity that desires to conduct a transaction (which may be, but is not limited to a financial transaction) with a merchant using a transaction account. An account holder user device 110 may be a mobile device or other processor that an account holder uses to carry out a transaction. An account may be held by any place, location, object, entity, or other mechanism for holding money or performing transactions in any form, including, without limitation, electronic form. An account may be, for example, a credit card account, a prepaid card account, stored value card account, debit card account, check card account, payroll card account, gift card account, prepaid credit card account, charge card account, checking account, rewards account, line of credit account, credit account, mobile device account, or mobile commerce account. In some instances, the account holder may be a transaction processing entity such as a financial institution, credit card provider, or other entity that offers accounts to customers. An account may or may not have an associated card, such as, for example, a credit card for a credit account or a debit card for a debit account. The account card may be associated or affiliated with a merchant or one or more social networking sites, such as a co-branded credit card.

Figure 6:
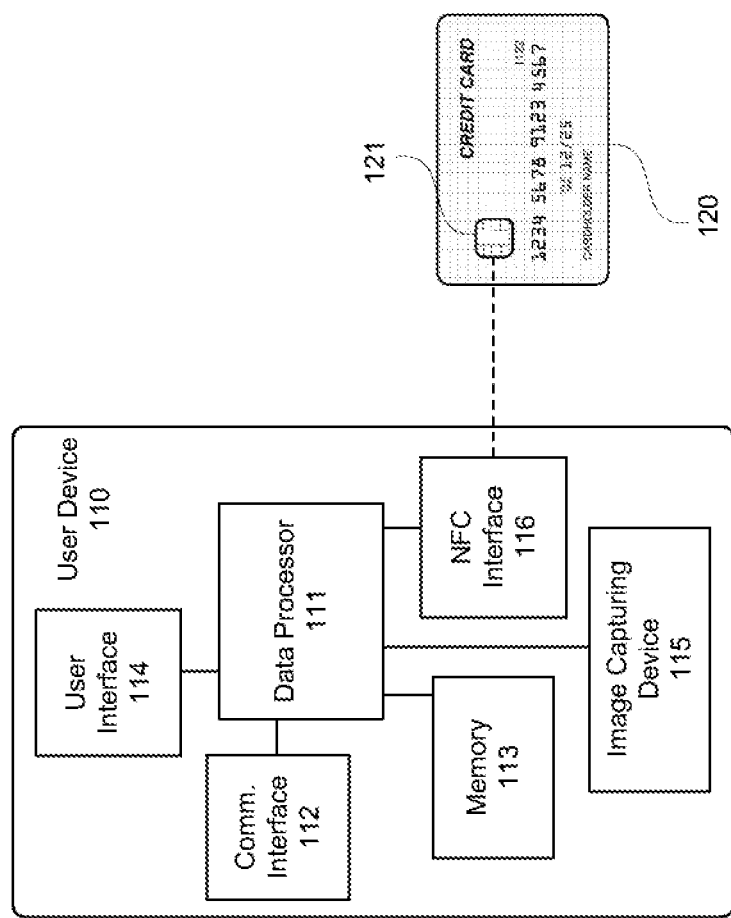
FIG. 6 is a schematic representation of a user device and a transferable transaction card usable in embodiments of the invention.
Figure 7:
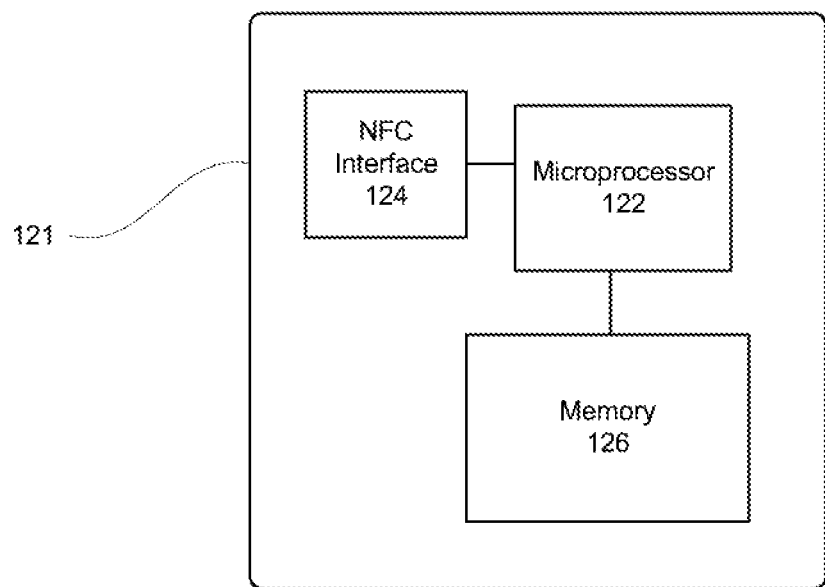
FIG. 7 is a block diagram of a microprocessor chip of the transferable transaction card of FIG. 6.

The transferable transaction card 120 may be any device having a processor configured for carrying out digital transactions and having a memory in which identification and encryption information can be permanently stored. This may include chip-carrying transaction cards ("smart" cards), and mobile and non-mobile user computing devices. As illustrated in FIGS. 6 and 7, a typical transferable transaction card 120 that is usable in various embodiments of the invention is a smart card with a microprocessor chip 121. The chip 121 microprocessor chip 121 microprocessor chip 121 chip 121 microprocessor chip 121 includes processing circuitry for storing and processing information, including a microprocessor 122 and a memory 126. It will be understood that the processing circuitry may contain additional components, including processors, memories, error and parity/CRC checkers, data encoders, anticollision algorithms, controllers, command decoders, security primitives and tamper-proofing hardware, as necessary to perform the functions described herein. The memory 126 may be a read-only memory, write-once read-multiple memory or read/write memory, e.g., RAM, ROM, and EEPROM, and the chip 121 may include one or more of these memories. The memory 126 may be configured to store one or more software applications for execution by the microprocessor 122. Information associated with an account may also be stored in the memory 126. In particular, the memory 126 may have permanently stored therein a unique alphanumeric identifier and a public and private card encryption keys.

The chip 121 microprocessor chip 121 further includes an NFC interface 124 configured for establishing communication with the user device 110 or other devices when the card 120 is within a predetermined NFC range. In some embodiments, the NFC interface 124 may comprise a radio frequency identification chip configured to communicate via NFC or other short-range protocols. In some embodiments, the microprocessor chip 121 may include circuitry configured for communication with the user device 110 via other means such as Bluetooth, satellite, Wi-Fi, wired communications, and/or any combination of wireless and wired connections.

In particular embodiments, the memory 126 of the chip 121 microprocessor chip 121 may have stored therein instructions for generating encrypted information and transmitting it to a receiving device (e.g., the user device 110) via the NFC interface 124. Such encrypted information may be or include an encrypted verification block or signature that may be used by the user device 110 or the card control processing system 150 to authenticate and verify the presence of the transaction card 110 during activation or transaction processing.

The user device 110 may be any computer device or communications device including a server, a network appliance, a personal computer (PC), a workstation, and a mobile interface device such as a smart phone, smart pad, handheld PC, or personal digital assistant (PDA). The user device 110 includes an on-board data processor 111 in communication with a memory module 113, a user interface 114, a communication interface 112, and an NFC interface 116. The user device 110 may optionally include an image capturing device 115 (e.g., a digital camera). The data processor 111 may include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 113 can be a read-only memory, write-once read-multiple memory or read/write memory, e.g., RAM, ROM and EEPROM, and the user device 110 can include one or more of these memories.

The user interface 114 of the device 110 includes a user input mechanism, which can be any device for entering information and instructions into the user device 110, such as a touch-screen, keyboard, mouse, cursor-control device, microphone, stylus, or digital camera. The user interface 114 may also include a display, which can be any type of device for presenting visual information such as a computer monitor, a flat panel display, and a mobile device screen, including liquid crystal displays, light-emitting diode displays, plasma panels, and cathode ray tube displays.

The communication interface 112 is configured to establish and support wired or wireless data communication capability for connecting the device 110 to the network 130 or other communication network. The communication interface 112 can also be configured to support communication with a short-range wireless communication interface, such as near field communication, radio-frequency identification, and Bluetooth, through communication interface 215, along with radio transmissions.

The NFC interface 116 is configured for establishing near field communication with the data processing chip 121 on board the indicialess transaction card 120. The NFC interface 116 is further configured for receiving information transmitted by the data processing chip 121 via the chip NFC interface 124.

In embodiments of the invention, the memory 113 may have stored therein one or more applications usable by the data processor 111 to conduct and/or monitor transactions between the user device 110, the merchant transaction processing devices 140, and the card control processing system 150 or other device over the network 130. These applications may include instructions usable by the data processor 111 to identify transaction events, store event data in the memory 113, and communicate event data to the card control processing system 150. Some applications may also include instructions relating to receiving and interpreting instructions from the card control processing system 150 and, in response, generating an image for display via the user interface 114.

In particular embodiments, the memory 113 may include an account application having instructions for activating a transferable transaction card 120a. These instructions are configured for receiving account information from the card control processing system 150 via the network 130 and the communication interface 112. The account information includes public and private personal encryption keys, which, upon, receipt, are stored in the memory 113. The account application instructions are further configured for establishing communication with a transferable card 120 (e.g., via the NFC interface 116) and for receiving from the card 120, card identification information that is or includes a hardware signature encrypted using the public and private card encryption keys. The account application may be further configured for constructing an encrypted software signature using the public and private personal encryption keys. The application may be still further configured with instructions to assemble and transmit a card activation request to the card control processing system 150, the request including both the encrypted hardware signature and the encrypted software signature.

The account application stored in memory 113 may also have instructions for transferring account functions from a first transferable transaction card 120a to a second transferable transaction card 120b. These instructions may be configured for establishing communication with the second transferable card 120b (e.g., via the NFC interface 116) and for receiving a hardware signature encrypted using the public and private card encryption keys stored on the card 120b. The account application may be further configured for constructing an encrypted software signature using the public and private personal encryption keys, and assembling and transmitting a transfer request to the card control processing system 150, the request including both the encrypted hardware signature for the second card 120b and the encrypted software signature.

The account application may also have instructions for transferring an activated card 120 from a first account to a second account. These instructions are configured for receiving and storing account information for the second account from the card control processing system 150 via the network 130 and the communication interface 112. The second account information includes public and private personal encryption keys associated with the second account. The account application instructions are further configured for establishing communication with the transferable card 120 (e.g., via the NFC interface 116) and for receiving from the card 120, card identification information that is or includes a hardware signature encrypted using the public and private card encryption keys. The account application may be further configured for constructing an encrypted software signature using the public and private personal encryption keys associated with the second account, and assembling and transmitting a transfer request to the card control processing system 150, the request including both the encrypted hardware signature and the encrypted software signature.

The card control processing system 150 is a system of one or more network-enabled processing servers configured to process transaction card control requests and transaction card function requests. The card control processing system 150 includes a transaction communication interface 152 that is connected to the network 130 for communication with the user device 110 and merchant devices 140. The network 130 may be any form of communication network capable of enabling communication between the transaction entities and the card processing system 100. For example, the network 130 may be one or more of a wireless network, a wired network or any combination of wireless network and wired network. The network 130 may be or include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal. The network 130 may utilize one or more protocols of one or more network elements to which it is communicatively coupled. The network 130 may translate to or from other protocols to one or more protocols of network devices. Although the network 130 is depicted as a single network, it will be appreciated that it may comprise a plurality of interconnected networks, such as, for example, the Internet, a service provider's network, a cable television network, corporate networks, and home networks.

The card control processing system 150 has a transaction processor 154 and a card management server 156, both of which are configured for communication over the network 130 via the transaction communication interface 152. The card management server 156 may be configured for maintaining a transferable card database (not shown) in which is stored identification information for each of the plurality of transferable cards. The server 156 may be further configured for assigning private and public personal encryption keys to an account of an account holder to whom a transferable transaction card 120 has been issued or is to be issued. Once assigned, the card management server may transmit, via the network 130, the personal encryption keys to a user device 110 associated with the account holder. The card processing system may be further configured to receive a request from the user device 110, via the network 130 and the transaction communication interface 152, to activate the transferable transaction card 120. The activation request includes a software signature encrypted by the user device 110 using the public and private personal encryption keys and a hardware signature encrypted by of the card's microprocessor chip 121 using the public and private card encryption keys stored therein. The card management server 156 is further configured to, upon receiving the activation request, decrypt the software and hardware signatures to verify their association with the account, and, upon positive verification, activate the transferable transaction card 120 by associating one or more authorized account functions with the transaction card 120. The server 156 may then store information reflecting the activation in the card database. An authorized account function could be any typical transaction card functionality such as, for example, interaction with a merchant transaction processing device to carry out a purchase transaction or use in an automatic teller machine. In some embodiments, the card processing server 156 may be configured to transmit a notification to the user device 110 indicating that the transaction card 120 is active and usable for carrying out authorized account functions. The card control processing server 156 is further configured to initiate a blockchain database 210 associated with the account and the transaction card 120. This may include transmitting blockchain information incorporating the hardware and software signatures to one or more computing system nodes 201 of a distributed consensus network 200 computing network, each of which may have a copy of the blockchain database stored thereon. The card management server 156 is configured to communicate with the processing system nodes 201 of the consensus computing network 200 via distributed network communication interface 158 connected to a consensus system communication network 230.

The card management server 156 may also be configured to carry out the actions associated with transferring an account function from a first transferable transaction card 120a to a second transferable transaction card 120b. These actions include receiving a request to transfer that includes a software signature encrypted by the user device 110 using the public and private personal encryption keys and a hardware signature encrypted by the microprocessor chip 121 of the second transaction card 120b. The actions may also include decrypting the software and hardware signatures to authenticate the card transfer request, and in response to positive authentication, disassociating the account functions from the first transaction card 120a and associating the account functions with the second transaction card 120b. The actions may further include updating the blockchain associated with the account to reflect the transfer of functionality from the first card 120a to the second card 120b. This may include transmitting transfer information, including the hardware and software signatures, to one or more of the computing system nodes 201 of the distributed computing network 200. In some embodiments, the original blockchain associated with the account and the first transaction card 120a may be updated to reflect the disassociation of that card 120a from the account and a new blockchain reflecting the association of the account with the second transaction card 120b initiated.

The card management server 156 may also be configured to carry out the actions associated with changing the association of a transferable transaction card 120 from a first account to a second account. These actions may include assigning a second private personal key and a second public personal key to the second account and transmitting the private and public personal keys to a second user device 110 associated with the second account. It will be understood that in some cases, the user device 110 associated with the second account may be the same device 110 that is associated with the first account. The actions may further include receiving from the second user device 110 via the network 130 a request to transfer the functionality of the transaction card 120 from the first account to the second account. The request may include a hardware signature generated by the transaction card 120 and a software signature encrypted by the second user device 110 using the second public and private personal encryption keys. The card management server 156 may be configured to authenticate the request by decrypting the signatures. The information included in the request and the actions involved in authenticating the request may depend on whether the request is received from the first or second user device. The server 156 may transmit a request for authorization to the first user device 110 and receive a response from the first user device including a software signature encrypted by the using the first public and private personal encryption keys. The server 156 may use the encrypted information received from both devices to authenticate the transfer. The account transfer actions may further include, upon authentication of the transfer request disassociating the transaction card 120 from the functions of the first and associating the transaction card 120 with one or more authorized account functions of the second account. In some embodiments, the card management server 156 may be configured to transmit a notification to either or both of the user devices to indicate that the transaction card 120 has been deactivated with respect to the first account and activated with respect to the second account. The card management server may be further configured to update the blockchain database 210 to reflect the transfer of card functionality from the first account to the second account. This may include transmitting transfer information, including the hardware and software signatures, to one or more of the computing system nodes 201 of the distributed computing network 200. In some embodiments, the original blockchain associated with the transaction card 120 may be updated to reflect the association of the transaction card 120 with the second account and disassociation of the card from the first account. In some embodiments, the original blockchain associated with the transaction card 120 may be updated to reflect the disassociation of the card from the first account and a new blockchain reflecting the association of the card 120 with the second account initiated.

The transaction card processing system 100 may include or be in communication with one or more merchant transaction processing devices 120. A merchant transaction processing device 140 may be any network enabled processor configured for processing a transaction involving the transferable transaction card 120. As used herein, a merchant is any entity with which an account holder carries out a transaction. This may include without limitation any retailer, wholesaler, or bartering entity. A merchant may have one or more physical locations or may be an online retailer. The merchant transaction processing device 140 may be any network enabled device (e.g., cash register or other POS terminal or an on-line transaction server) that is capable of communicating with the transaction card 140 (e.g., by NFC communication) or otherwise receiving transaction card information for carrying out a transaction and is capable of communicating with the transaction processor 154 via the network 130.

The transaction processing server 154 may be one or more servers configured for communication with the user device 110 and the merchant transaction processing devices 140 via the network 130. The processing server 120 is configured, in particular, for receiving a transaction processing request from a requesting merchant device 140. Such a request may include identification of a transferable transaction card 120 associated with an account, which has been presented to the merchant for use in a transaction. The transaction processing server 154 may be configured to verify that the transaction card 120 is authorized to carry out the requested transaction. The transaction processor 154 may be further configured to transmit a verification request to a user device 110 associated with the account and receiving a verification response from the user device. The verification response may include a hardware signature encrypted by the transaction card using its public and private card encryption keys and a software signature encrypted by the user device using public and private personal keys associated with the account. The transaction processor 154 may be configured to use the encrypted keys to authenticate the transaction, and responsive to authentication, process the transaction, and transmit a notification to the requesting merchant device 140. In some embodiments, the transaction processor 154 may be configured to update the blockchain associated with the card 120 and the account to reflect the transaction and to transmit information, including the encrypted signatures, to one or more processing nodes 201 of the consensus network 201.

The methods and systems of the present invention provides a significant improvement to the use of transaction cards by providing a secure way to transfer the functionality of such cards from one account to another. This will allow highly personalized and intrinsically valuable cards to have an extended useful life.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A method for activating account-variable transaction cards provided by a card issuer, each of the account-variable transaction cards having a card memory with a private card key and a public card key, associated with one of a plurality of account holder devices, the method comprising:

associating, by a processing system of the card issuer, a private personal key and a public personal key with a first account of the plurality of accounts, the first account being associated with a first account holder device of the plurality of account holder devices;

transmitting, by the processing system to the first account holder device via a network, a copy of the private personal key and a copy of the public personal key;

receiving, by the processing system from the first account holder device via the network, a request for activation of a first account-variable transaction card having a first private card key and a first public card key, the request including a first software signature and a first hardware signature;

decrypting, by the processing system, the first software signature using the private personal key and the first hardware signature using the first private card key;

verifying, by the processing system, association of the first software signature and the first hardware signature with the first account;

associating, by the processing system, an account function with the first account-variable transaction card;

initiating, by the processing system, an account blockchain associated with the first account and the first account-variable transaction card by transmitting blockchain information comprising the first software and hardware signatures to one or more nodes of a distributed computing network and storing the blockchain information in a blockchain database.

2. A method according to claim 1 further comprising:

receiving, by the processing system from a requesting transaction device, a transaction processing request for a transaction;

transmitting, by the processing system to the first account holder device, a transaction authorization request;

receiving, by the processing system from the first account holder device, an authorization response including a second software signature and a second hardware signature;

verifying, by the processing system, authorization of the first account-variable transaction card for the transaction function; and responsive to verified authorization, processing, by the processing system, the transaction using the account function.

3. A method according to claim 2 further comprising, responsive to verified authorization:

providing, by the processing system to a second node in the distributed consensus network, instructions to update the account blockchain.

4. A method according to claim 1 further comprising:

receiving, by the processing system from the first account holder device via the network, a request for transfer of account functionality to a second account-variable transaction card having a second private card key and a second public card key, the request including a third software signature and a third hardware signature;

authenticating the request for transfer, by the processing system, by decrypting the third software signature using the private personal key and the third hardware signature using the second private card key; and responsive to the request for transfer, disassociating, by the processing system, the account function from the first account-variable transaction card, and associating, by the processing system, the account function with the second account-variable transaction card.

5. A method according to claim 4 further comprising, responsive to the request transfer:

providing, by the processing system to a third node in the distributed consensus network, instructions to update the account blockchain.

6. A method according to claim 1 further comprising:

associating, by the processing system, a second private personal key and a second public personal key with a second account of the plurality of accounts, the second account being associated with a second account holder device of the plurality of account holder devices;

transmitting, by the processing system to the second account holder device, a copy of the second private personal key and a copy of the second public personal key;

receiving, by the processing system from the second account holder device via the network, a request for activation of the first account-variable transaction card, the request including a fourth software signature and a fourth hardware signature;

decrypting, by the processing system, the fourth software signature using the second private personal key and the fourth hardware signature using the first private card key;

verifying, by the processing system, association of the fourth software signature and the fourth hardware signature with the second account;

associating, by the processing system, a second account function with the first account-variable transaction card; and initiating, by the processing system, a second account blockchain associated with the second account and the first account-variable transaction card by transmitting second blockchain information comprising the fourth software and hardware signatures to a fourth node in the distributed computing network and storing the second blockchain information in the blockchain database.

* * * * *